No. 882,416. PATENTED MAR. 17, 1908.
M. W. PITNER.
CHECK VALVE.
APPLICATION FILED MAY 29, 1907.
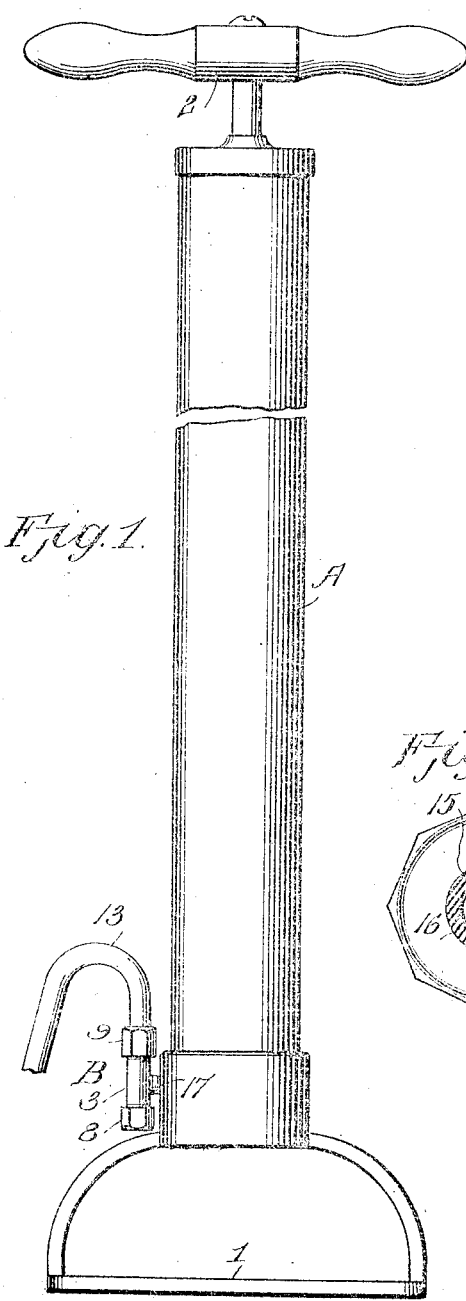
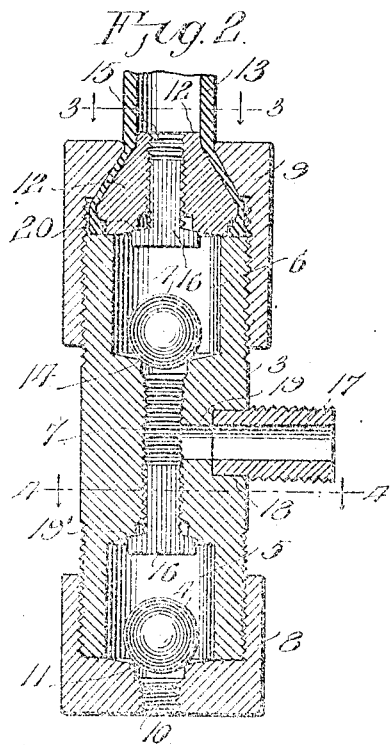
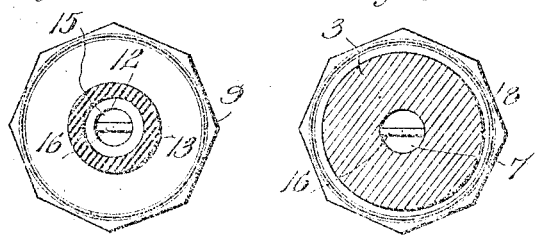
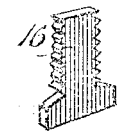
Witnesses
Frank Hough
C. Bradway
Inventor
Marion W. Pitner,
By Victor J. Evans
Attorney

UNITED STATES PATENT OFFICE.

MARION W. PITNER, OF CHICAGO, ILLINOIS.

CHECK-VALVE.

No. 882,416.

Specification of Letters Patent.

Patented March 17, 1908.

Application filed May 29, 1907. Serial No. 376,312.

*To all whom it may concern:*

Be it known that I, MARION W. PITNER, a citizen of the United States, residing at Chicago, in the county of Cook and State of Illinois, have invented new and useful Improvements in Check-Valves, of which the following is a specification.

This invention relates to check valves of the ball type especially useful in connection with pumps, pipes or other conduits whereby fluid passes in only one direction.

The invention has for one of its objects to improve and simplify the construction and operation of devices of this character so as to be comparatively easy and inexpensive to manufacture, thoroughly reliable and efficient in use, and adapted for a variety of purposes in which check valves are required.

A further object of the invention is the provision of a check valve including a casing or chamber having inlet and outlet passages into either of which may be inserted a stop for preventing the ball valve from closing the discharge port when the valve is moved to full open position.

A still further object is to provide a valve casing having oppositely disposed passages into one of which is threaded a stop for the ball valve, and the other of which terminates in a valve seat, the valve stop being so shaped as to permit fluid to flow on opposite sides thereof.

Another object of the invention is the provision of a valve casing containing inlet and discharge valves for controlling the passage of fluid from one point to another and especially adapted for use in connection with air or other pumps, and at the same time containing features rendering it adaptable for more general use.

With these objects in view and others, as will appear as the description proceeds, the invention comprises the various novel features of construction and arrangement of parts which will be more fully described and set forth with particularity in the claims appended hereto.

In the accompanying drawing, which illustrates one of the embodiments of the invention, Figure 1 is a side view of an ordinary hand pump showing the valve device applied thereto. Fig. 2 is an enlarged longitudinal section of the device. Fig. 3 is a section on line 3—3, Fig. 2. Fig. 4 is a transverse section on line 4—4, Fig. 2. Fig. 5 is a perspective view of one of the valve stops.

Similar reference characters are employed to designate corresponding parts throughout the several views.

Referring to the drawing, A designates the cylinder of an ordinary hand pump used for pumping up tires and for supplying air under pressure for other purposes, the cylinder being mounted in the usual manner in a foot stirrup 1 and having a piston operated by the handle 2. The admission and discharge of air to and from the pump is controlled by my improved valve device designated generally by B. This device comprises a casing 3 that is chambered at opposite ends for receiving the balls 4, and between the chambers 5 and 6 is a connecting passage 7. The ends of the cylindrical casing 3 are exteriorly threaded for receiving the cap nuts 8 and 9. In the present instance, the nut 8 has an opening 10 communicating with the atmosphere and through which air is drawn into the pump, and the inner end of the opening forms a valve seat at 11 with which the lower ball valve engages, and the upper nut 9 coöperates with a frusto-conical spreading member 12 for connecting a hose or other pipe 13 to the valve casing. In case the valve device is used in a gas or liquid system, an inlet pipe can be connected with the inlet chamber 5 in the same manner that pipe 13 is connected with the device, the external threads on the casing 3 permitting of the reception of the nut 9. The top end of the passage 7 terminates in a seat 14 for the discharge valve. In order to prevent the valves from closing the lower ends of the passage 7 of the casing and passage 15 of the spreading member 12, stops 16 are inserted in these passages, the head or lower end of these stops being arranged to extend into the chambers 5 and 6 a sufficient distance to prevent the valves from engaging the ends of the passages. As shown in Fig. 5, each stop is in the form of a T that is flat so that when inserted in its passage, it will not close the latter. The stops may be secured in place in any approved manner, as for instance by tapping the passages 7 and 15 and screwing the stops into the same. They are just thin enough to have the necessary mechanical strength to resist the shocks of the valves striking them, it being advantageous to make the stops thin so as to restrict the passages as little as possible and hence, reduce the resistance to the flow of liquid. For attaching the device to a pump, an externally threaded coupling member 17 is inserted in the enlarged or counterbored portion 18 of the passage 19 that communicates with the passage 7 at a point intermediate the ends of the latter, the coupling member 17 being braced or otherwise suitably secured or cast integral with the casing 3, if desired. The outer end of the coupling member 17 is screwed into the pump cylinder or suitable part and communicates with the interior of the cylinder.

The operation of the device may be briefly described as follows:—By moving the piston of the pump outwardly, the inlet valve will be raised so as to admit air and the discharge valve will rest on its seat 14 by the combined effect of the pressure in the pipe 13, suction in the passage 7, and gravity. The air enters the chamber 5 through the inlet 10, and flows through the passage 7 at opposite sides of the lower stop 16, and thence to the pump through the passage 19 and coupling member 17. At the end of the upstroke, the inlet valve will drop and close the inlet port, and as the pump piston is moved downwardly, the air is forced out of the cylinder into the casing 3, thereby lifting the discharge valve and permitting the air to pass through the chamber 6, passage 15, and into the discharge pipe 13 to the point of consumption. As soon as the flow of air ceases, the discharge valve will automatically seat and will thus hold the pressure in the pipe 13 and apparatus supplied thereby.

In order to render the device reversible, or that is to say, use the chamber 6 as an inlet and the chamber 5 as an outlet, the passage 10 of the nut 8 is threaded so as to receive the stop 16, and the passage 7 is threaded at both ends, so that the stop can be removed from the spreading member 12 and inserted in the said passage. Obviously in this case, the casing would be arranged so that what is now the upper end would be lowermost to insure the automatic closing of the valves by gravity. Furthermore, to enable this interchangeability, the top and bottom ends of the chambers 5 and 6 are provided with valve seats. In other words, the chamber 5 has a valve seat 19 opposite the seat 11 and the spreading member 12, a seat 20 opposite the seat 14. Since the passages 7, 10 and 15 are threaded at their inner ends, it is preferable to counterbore said inner ends so that sharp edges are presented to the valves, thereby preventing any sediment or grit getting between the valves and their seats, as would be the case if conical seats were employed.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired, as are within the scope of the claims.

Having thus described the invention, what is claimed, is:—

1. The combination of a casing having threaded passages, seats at the inner ends of the passages, a ball valve arranged to engage either one of the seats, and a removable stop threaded in the passage serving as an abutment for preventing the valve from engaging the seat of the outlet passage.

2. The combination of a casing having oppositely disposed passages, seats at the inner ends of the passages, a valve adapted to engage one of the seats, and a removable stop of flat T-shaped form adapted to fit interchangeably in either of the passages for preventing the valve from engaging the seat of such passage.

3. The combination of a casing provided with a chamber having a passage, a removable member closing one side of the chamber and provided with a passage, said passages being threaded and counterbored at their inner ends to form suitable valve seats, a ball valve in the chamber for engaging one of the seats, and a stop having a threaded engagement with either one of the passages for preventing the valve from closing the seat of such passage.

4. The combination of a casing having chambered ends, ball valves in the chamber, valve seats in the chambers, a threaded passage between the chambers, threaded inlet and outlet passages, and stops for the valves having threaded engagement with the outlet passages of the chambers.

5. The combination of a casing having two chambers, admission and discharge openings for each chamber, ball valves in the chambers, a conduit in the casing connecting the discharge opening of one chamber with the admission opening of the other chamber, a combined inlet and outlet passage communicating with the conduit, and removable stops at the discharge openings for preventing the valves from closing the latter and adapted to be used interchangeably in either of the openings of each chamber for reversing the action of the valves.

6. The combination of a casing provided with a chamber having a passage, a spreading member having a passage, a nut coöperating with the spreading member for connecting a pipe with the casing, a ball valve in the chamber, seats at the inner ends of the passages, and a stop adapted for use at either seat for preventing the valve from engaging the same.

7. The combination of a member having a threaded passage, and a flat piece having teeth in its side edges engaging the thread of the passage and arranged with a portion extending out of the passage to form a valve stop.

In testimony whereof, I affix my signature in presence of two witnesses.

MARION W. PITNER.

Witnesses:
JOHN L. FLETCHER,
CHATTIN BRADWAY.